United States Patent
Hamel et al.

(10) Patent No.: US 11,425,115 B2
(45) Date of Patent: Aug. 23, 2022

(54) IDENTIFYING REVOKED CREDENTIALS

(71) Applicant: Workday, Inc., Pleasanton, CA (US)

(72) Inventors: Bjorn Hamel, Dublin, CA (US); Jonathan David Ruggiero, Danville, CA (US)

(73) Assignee: Workday, Inc., Pleasanton, CA (US)

( * ) Notice: Subject to any disclaimer, the term of this patent is extended or adjusted under 35 U.S.C. 154(b) by 231 days.

(21) Appl. No.: 16/021,243

(22) Filed: Jun. 28, 2018

(65) Prior Publication Data

US 2019/0303590 A1    Oct. 3, 2019

Related U.S. Application Data

(60) Provisional application No. 62/648,854, filed on Mar. 27, 2018.

(51) Int. Cl.
  *G06F 21/00* (2013.01)
  *H04L 9/40* (2022.01)
  (Continued)

(52) U.S. Cl.
  CPC ............ *H04L 63/083* (2013.01); *G06F 16/27* (2019.01); *G06F 21/31* (2013.01); *G06F 21/45* (2013.01);
  (Continued)

(58) Field of Classification Search
  CPC ... H04L 63/083; H04L 9/0891; H04L 9/3247; G06F 16/27; G06F 21/31; G06F 21/45; G06F 21/604; G06F 21/6245
  See application file for complete search history.

(56) References Cited

U.S. PATENT DOCUMENTS

| | | | |
|---|---|---|---|
| 6,662,299 | B1 | 12/2003 | Price, III |
| 7,437,755 | B2 | 10/2008 | William |
| | | (Continued) | |

FOREIGN PATENT DOCUMENTS

| | | |
|---|---|---|
| CA | 2606326 | 11/2006 |
| DE | 19882328 | 5/2014 |
| | (Continued) | |

OTHER PUBLICATIONS

Ori Jacobovitz. "Blockchain for identity management." The Lynne and William Frankel Center for Computer Science Department of Computer Science. Dec. 2016 (Dec. 2016) Retrieved on May 27, 2019 from https://www.cs.bgu.ac.il/~frankel/TechnicalReports/2016/16-02.pdf.

(Continued)

*Primary Examiner* — Trong H Nguyen
*Assistant Examiner* — Michael M Lee
(74) *Attorney, Agent, or Firm* — Van Pelt, Yi & James LLP

(57) ABSTRACT

A system for providing an application includes an interface and a processor. The interface is configured to receive an indication to provide an application to a device. The processor is configured to provide the application to the device. The application is configured to: receive a request for a list of valid credentials; determine a list of stored credentials; provide the list of stored credentials to a database system; receive an indication of revoked credentials from the database system; and determine the list of valid credentials based at least in part on the list of stored credentials and the revoked credentials.

11 Claims, 13 Drawing Sheets

(51) Int. Cl.
*H04L 9/32* (2006.01)
*G06F 21/45* (2013.01)
*G06F 21/31* (2013.01)
*G06F 16/27* (2019.01)
*G06F 21/60* (2013.01)
*G06Q 10/10* (2012.01)
*H04L 9/08* (2006.01)
*G06F 21/62* (2013.01)

(52) U.S. Cl.
CPC ......... *G06F 21/604* (2013.01); *G06Q 10/105* (2013.01); *H04L 9/0819* (2013.01); *H04L 9/0891* (2013.01); *H04L 9/3213* (2013.01); *H04L 9/3226* (2013.01); *H04L 9/3247* (2013.01); *H04L 63/0428* (2013.01); *G06F 21/6245* (2013.01)

(56) References Cited

U.S. PATENT DOCUMENTS

| | | |
|---|---|---|
| 7,735,120 B2 | 6/2010 | Wallace |
| 8,719,952 B1 | 5/2014 | Damm-Goossens |
| 8,745,718 B1 | 6/2014 | Dufel |
| 9,374,368 B1 | 6/2016 | Roth |
| 9,419,968 B1 | 8/2016 | Pei |
| 9,485,096 B2 | 11/2016 | Shrivastava |
| 9,490,984 B2 | 11/2016 | Leicher |
| 9,672,538 B1 | 6/2017 | Vaynblat |
| 9,749,140 B2 | 8/2017 | Oberhauser |
| 10,360,363 B1 | 7/2019 | Grosberg |
| 10,460,313 B1 | 10/2019 | Clark |
| 2002/0176583 A1 | 11/2002 | Buttiker |
| 2004/0162985 A1* | 8/2004 | Freeman ............... H04L 9/3247 713/176 |
| 2004/0177276 A1 | 9/2004 | MacKinnon |
| 2006/0200856 A1 | 9/2006 | Salowey |
| 2008/0148373 A1 | 6/2008 | Adams |
| 2008/0301553 A1 | 12/2008 | Basu |
| 2009/0119756 A1 | 5/2009 | Acuna |
| 2011/0113484 A1 | 5/2011 | Zeuthen |
| 2012/0079570 A1 | 3/2012 | Fu |
| 2013/0030989 A1 | 1/2013 | Geller |
| 2013/0125231 A1 | 5/2013 | Kuenzi |
| 2014/0002236 A1 | 1/2014 | Pineau |
| 2014/0079221 A1 | 3/2014 | McCallum |
| 2014/0096213 A1* | 4/2014 | Quan ................... G06F 21/606 726/7 |
| 2014/0181927 A1* | 6/2014 | Sarkissian .......... G06Q 30/0251 726/6 |
| 2014/0187149 A1 | 7/2014 | Lortz |
| 2014/0222682 A1 | 8/2014 | Dua |
| 2014/0281525 A1 | 9/2014 | Acar |
| 2014/0373117 A1* | 12/2014 | Le Saint ............... H04L 9/3066 726/6 |
| 2015/0089244 A1 | 3/2015 | Roth |
| 2015/0278500 A1 | 10/2015 | Burch |
| 2015/0278824 A1 | 10/2015 | Zabar |
| 2015/0288694 A1 | 10/2015 | Liebl, III |
| 2015/0350913 A1* | 12/2015 | Eberwine ........... G07C 9/00571 455/411 |
| 2016/0149896 A1 | 5/2016 | Sarkissian |
| 2016/0162896 A1 | 6/2016 | Grigg |
| 2016/0255079 A1* | 9/2016 | Harrison ............. H04L 63/0876 713/2 |
| 2016/0330027 A1 | 11/2016 | Ebrahimi |
| 2017/0005804 A1 | 1/2017 | Zinder |
| 2017/0005809 A1* | 1/2017 | Adam ..................... G06Q 10/10 |
| 2017/0012784 A1 | 1/2017 | Cross |
| 2017/0041151 A1 | 2/2017 | Kommireddy |
| 2017/0109759 A1 | 4/2017 | Korb |
| 2017/0126661 A1 | 5/2017 | Brannon |
| 2017/0155626 A1* | 6/2017 | Li ....................... H04L 63/0442 |
| 2017/0155686 A1 | 6/2017 | Yanacek |
| 2017/0180128 A1 | 6/2017 | Lu |
| 2017/0222814 A1 | 8/2017 | Oberhauser |
| 2017/0250972 A1 | 8/2017 | Ronda |
| 2017/0257358 A1 | 9/2017 | Ebrahimi |
| 2017/0277773 A1 | 9/2017 | Iasi |
| 2017/0302659 A1 | 10/2017 | Shteingart |
| 2017/0317997 A1 | 11/2017 | Smith |
| 2017/0338967 A1* | 11/2017 | Lewison ................. H04L 9/321 |
| 2017/0372055 A1 | 12/2017 | Robinson |
| 2018/0075247 A1* | 3/2018 | Campero ................. G07C 9/28 |
| 2018/0124041 A1 | 5/2018 | Bhalerao |
| 2018/0144563 A1 | 5/2018 | Reymann |
| 2018/0159839 A1* | 6/2018 | Citron ................. H04L 63/0853 |
| 2018/0167394 A1 | 6/2018 | High |
| 2018/0248859 A1 | 8/2018 | Zudic |
| 2019/0036710 A1* | 1/2019 | Qiu ....................... H04L 9/3239 |
| 2019/0164156 A1 | 5/2019 | Lindemann |
| 2019/0230073 A1 | 7/2019 | Patel |
| 2019/0230092 A1 | 7/2019 | Patel |
| 2019/0363889 A1 | 11/2019 | Wang |
| 2020/0145219 A1 | 5/2020 | Sebastian |

FOREIGN PATENT DOCUMENTS

| | | |
|---|---|---|
| WO | 2010083522 | 7/2010 |
| WO | 2017085546 | 5/2017 |
| WO | 2017127564 | 7/2017 |

OTHER PUBLICATIONS

Andrew Tobin, "Sovrin: What Goes on the Ledger", white paper, Apr. 2017.
Reed et al.,: "Decentralized Identifiers (DIDs) v0.9", Feb. 12, 2018 (Feb. 12, 2018), XP055855370, Retrieved from the Internet: URL: https://web.archive.org/web/20180212212114/https://w3c-ccg.github.io/did-spec/#proof-optional [retrieved on Oct. 27, 2021].
The Sovrin Foundation, "Sovrin™: A Protocol and Token for SelfSovereign Identity and Decentralized Trust", white paper, Jan. 2018.
Windley et al.: "Sovrin (TM): A Protocol and Token for Self-Sovereign Identity and Decentralized Trust A White Paper from the Sovrin Foundation", White Paper, Jan. 1, 2018 (Jan. 1, 2018), pp. 1-42, XP055648450, US, Retrieved from the Internet: URL: https://sovrin.org/wp-content/uploads/Sovrin-Protocol-and-Token-White-Paper.pdf [retrieved on Dec. 2, 2019].

* cited by examiner

IDENTIFYING REVOKED CREDENTIALS

CROSS REFERENCE TO OTHER APPLICATIONS

This application claims priority to U.S. Provisional Patent Application No. 62/648,854 entitled SYSTEM FOR ISSUANCE, VERIFICATION, AND REVOCATION OF CREDENTIALS filed Mar. 27, 2018 which is incorporated herein by reference for all purposes.

BACKGROUND OF THE INVENTION

Modern users of database systems (e.g., human resources database systems or financial database systems) rely on the database systems for access to their personal information or verification (e.g., salary, tax details, employment status, etc. or university degree, certifications, criminal record, ownership, etc.). Users trust the database systems to contain correct information. When a user desires to provide personal information or verification information from the database system to another database system (e.g., providing previous employment or salary information to a potential employer, providing previous insurance information to a potential employer), the user typically accesses the information on the database system and then provides the information manually to the other database system (e.g., by inputting data into an electronic form or uploading digital paperwork). The user trusts the information it receives from the database system, however the other database system cannot have the same level of trust in the information it receives from the user. There is a problem wherein it is difficult to trust data as it passes from system to system via a human.

BRIEF DESCRIPTION OF THE DRAWINGS

Various embodiments of the invention are disclosed in the following detailed description and the accompanying drawings.

DETAILED DESCRIPTION

Figure 1:
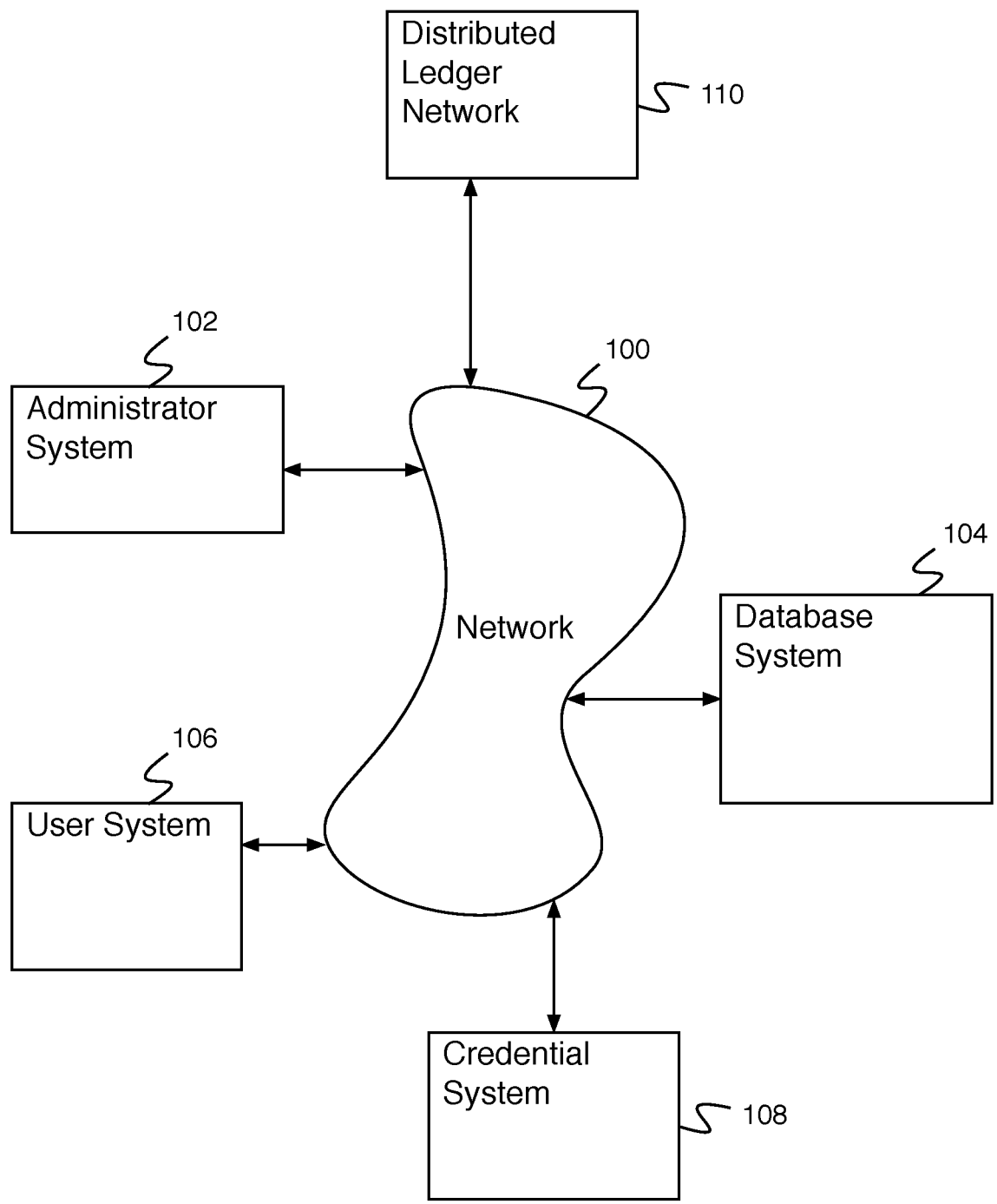
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for providing an application comprises an interface configured to receive an indication to provide an application to a device, and a processor configured to provide the application to the device. The application is configured to receive a request for a list of valid credentials, determine a list of stored credentials, provide the list of stored credentials to a database system, receive an indication of revoked credentials from the database system, and determine the list of valid credentials based at least in part on the list of stored credentials and the revoked credentials.

A system for identifying revoked credential information comprises an interface configured to receive a request for a list of valid credentials, and a processor configured to determine a list of stored credentials, provide the list of stored credentials to a database system, receive an indication of revoked credentials from the database system, and determine the list of valid credentials based at least in part on the list of stored credentials and the revoked credentials.

A system for sharing credentials comprises a system for a user system (e.g., a computing system for use by a user) interacting with a database system. The database system further interacts with a credential issuing system. The database system stores user information for the user. The database system further determines a set of credentials available to the user based on the user information as well as record of previously issued credentials. The credentials comprise categories satisfied by the user information at differing levels of specificity. For example, in the case where the user comprises an employee earning $95,000 per year, the database system could determine credentials available to the user indicating that the user earns more than $60,000 per year, that the user earns more than $80,000 per year, that the user earns in the range of $90,000-$100,000 per year, etc. When the user interacts with the database system using a credential app, the database system determines the set of credentials available to the user and provides the list of credentials to the credential app or application. The user can then request that one or more available credentials be downloaded to local storage using the credential app. When the user interacts with another system requesting personal information or verification information, a stored credential can be used to provide proof of the requested information.

When a user accesses a credential app, the credential app determines a list of stored credentials available to the user as proof of information. The credential app determines a list of stored credentials and checks their validity by providing the list to the database system. The database system queries a credential system, which determines whether a revocation indication has been written to a distributed ledger network for each of the stored credentials. Any revoked credentials of the stored credentials are determined by the credential system, and an indication of the revoked credentials is provided to the database system. The credential server revokes the credential in such a way that its validity is publicly verifiable (e.g., cryptographic keys used for verification can be found in a public or semi-public distributed ledger system). The database system then provides an indication of the revoked credentials to the user system. The user system deletes stored credential information associated with the revoked credentials. Metadata associated with the credentials is stored in order to enable a display that the credentials were revoked, and is purged when the user desires.

By enabling the transfer of personal information or verification information (e.g., salary, tax details, employment status, etc. or university degree, certifications, criminal record, ownership, etc.) between disparate database systems using authenticated credentials, this system allows that transfer of information with a level of trust and security not previously accomplished. This allows the reduction or elimination of problems such as data theft during information transfer and misrepresentation of personal information or verification information.

The system is a better computer system enabling efficient secure distribution of information. For example, the system is set up to securely receive and provide information. The security protocols and the distributed ledger storage enable credentialing data and being able to act as a trusted source for the data.

In some embodiments, a technology other than a secure distributed ledger is used for securely storing public keys that enable the verifiability of data. In some embodiments, a shared accessible network accessible medium is used to distribute public keys associated with the verifiability of authenticated credentials. This shared public network could be an open model like Twitter where users tweet the public key information (keybase.io does this), or a semi-private shared database of public keys for which the participants in the credentials exchanges all have authenticated access via a set of RESTful APIs to fetch keys for credential verification.

FIG. 1 is a block diagram illustrating an embodiment of a network system. In some embodiments, the network system of FIG. 1 comprises a network system for a system for validating data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, database system 104, user system 106, credential system 108, and distributed ledger network 110 communicate via network 100. Administrator system 102 comprises an administrator system for use by an administrator. Administrator system 102 comprises an administrator system for executing administrator commands, for configuring database system 104, etc. Database system 104 comprises a database system for providing user access to data stored in a tenanted area of database system 104 (e.g., access to add data, view data, modify data, delete data, access reports, execute business processes, etc.). Database system 104 additionally comprises a system for providing a credential to a user. The credential comprises a digital token that may be provided to a different database system securely indicating user data. Credential system 108 comprises a system for creating a credential and providing the credential to database system 104. Credential system 108 writes credential information to distributed ledger network 110 when a credential is created. Database system 104 additionally comprises a system for determining to revoke a credential. Credential system 108 receives an indication from database system 104 to revoke a credential and writes revocation information to distributed ledger network 110 to revoke the credential. Database system 104 additionally comprises a system for determining whether a credential has been revoked. Credential system 108 receives an indication from database system 104 to determine whether a credential has been revoked and queries distributed ledger network 110 to determine whether revocation information associated with the credential has been written.

User system 106 comprises a user system for use by a user. A user uses a user system to interact with database system 104, for example to store database data, to request database data, to request reporting based on database data, to request a credential based on database data, etc. In some embodiments, the network system of FIG. 1 comprises a plurality of user systems associated with one or more users. A user uses a user system to provide an indication to database system 104 requesting a credential (e.g., a credential based on data stored by database system 104).

User system 106 receives login information associated with a user, determines credentials available to the user, and provides an indication of the credentials available to the user. Determining credentials available to the user comprises identifying revoked credential information. User system 106 is configured to receive a request for a list of valid credentials; determine a list of stored credentials; provide the list of stored credentials to a database system; receive an indication of revoked credentials from the database system; and determine the list of valid credentials based at least in part on the list of stored credentials and the revoked credentials.

User system 106 then receives an indication to add a credential (e.g., one of the credentials available to the user), creates a credential request, and provides the credential request to a server system (e.g., database system 104). User system 106 then receives and stores the credential. Upon receive the credential request, database system 104 verifies that the user has access to the credential (e.g., that the credential is valid for the user) and in the event that the user has access to the credential, database system 104 requests the credential from credential system 108. Database system 104 receives the credential from credential system 108 and provides it to user system 106.

Figure 2:
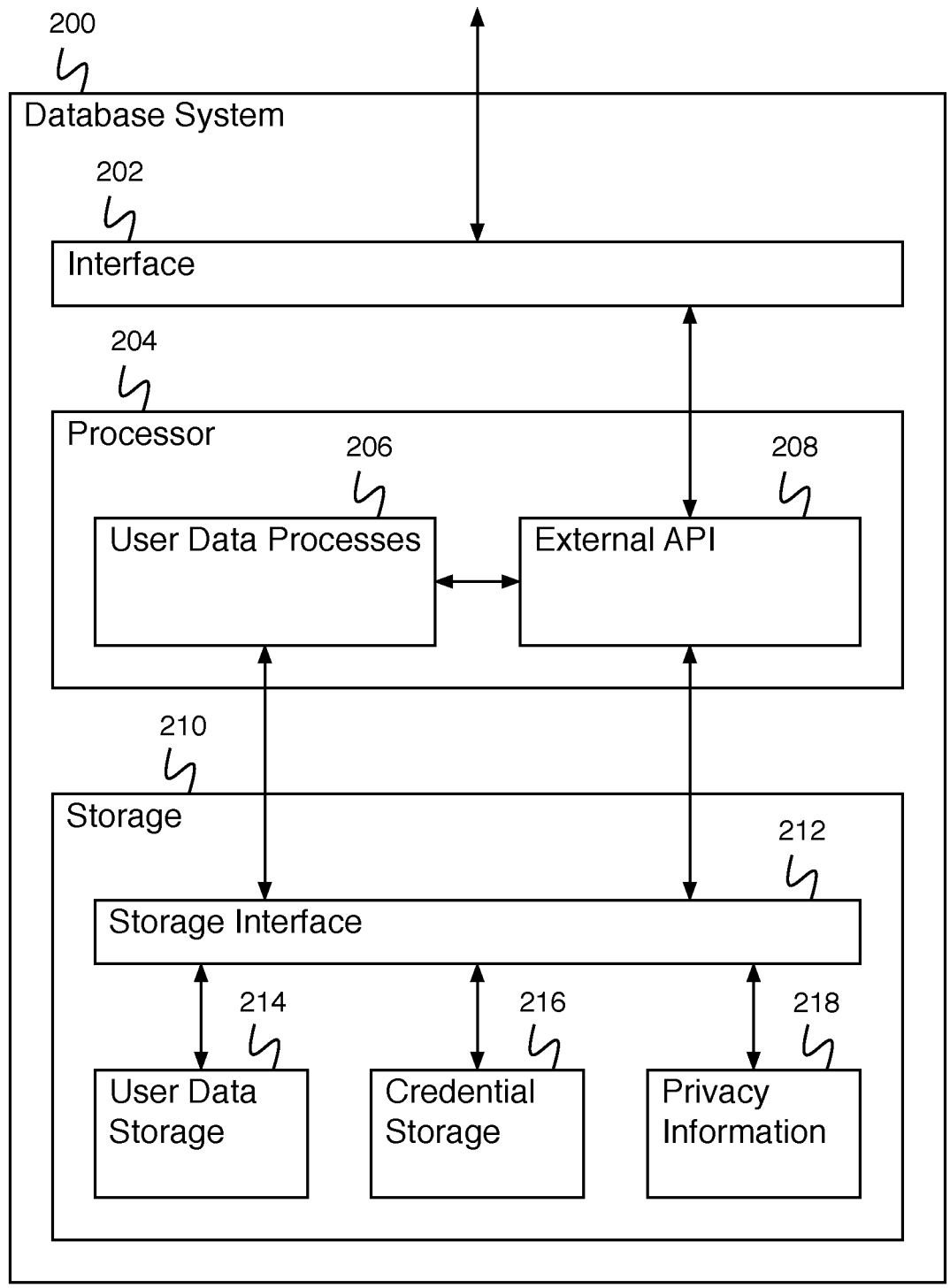
FIG. 2 is a block diagram illustrating an embodiment of a database system.

FIG. 2 is a block diagram illustrating an embodiment of a database system. In some embodiments, database system 200 comprises database system 104 of FIG. 1. In the example shown, database system 200 comprises interface 202, processor 204, and storage 210. Interface 202 comprises an interface for communicating with processor 204 and with an external network (e.g., network 100 of FIG. 1, for communication with an administrator system, a user system, a credential system, etc.). Processor 204 comprises a processor for processing data, performing computations, controlling communications, etc. Processor 204 comprises external API (e.g., application programming interface) 208 for interacting with external systems, allowing external systems to request processor 204 perform actions, etc. User data processes 206 comprises a set of processes for manipulating (e.g., reading, writing, modifying, deleting, etc.) user data (e.g., user data stored in user data storage 214) and credentials (e.g., credentials stored in credential storage 216). User data processes 206 and external API 208 communicate with data stored in storage 210 via storage interface 212. User data storage 214 comprises user data describing users associated with database system 200. Credential storage 216 comprises credentials accessed by database system 200. Privacy information 218 comprises privacy information associated with credentials stored by credential storage 216.

Database system 200 receives a request from a user system for an indication of revoked credentials based on a list of credentials. Database system 200 receives the list of credentials and provides a credential identifier associated with each credential to a credential system. Database system 200 then receives an indication of whether the credential was revoked for each credential. Database system 200 provides the user system an indication of revoked credentials.

Database system 200 receives a request for a credential associated with a user (e.g., a user for the credential) and associated with a credential identifier (e.g., a credential identifier identifying the requested credential). Database system 200 then determines that the credential identifier is valid for the user (e.g., that the user is entitled to the indicated credential), determines privacy information associated with the requested credential, and provides the credential request to a credential server. Database system 200 receives the credential from the credential server and provides the credential, the privacy information, and the credential identifier (e.g., to the requesting user system). In some embodiments, privacy information is stored as metadata.

Figure 3:
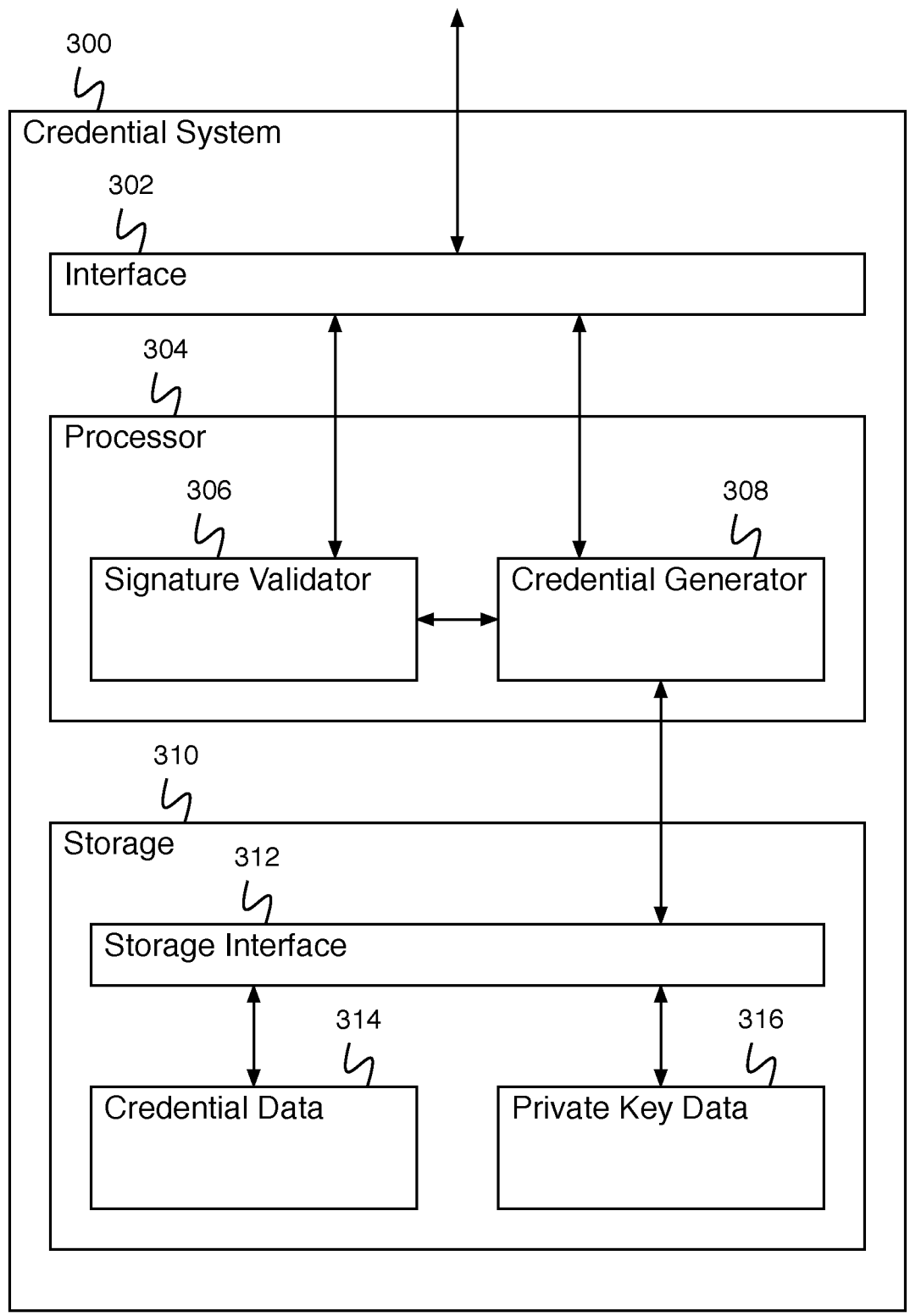
FIG. 3 is a block diagram illustrating an embodiment of a credential system.

FIG. 3 is a block diagram illustrating an embodiment of a credential system. In some embodiments, credential system 300 comprises credential system 108 of FIG. 1. In the example shown, credential system 300 comprises interface 302, processor 304, and storage 310. Interface 302 comprises an interface for communicating with processor 304 and with an external network (e.g., network 100 of FIG. 1, for communication with an administrator system, a user system, a database system, etc.). Processor 304 comprises a processor for processing data, performing computations, controlling communications, etc. Processor 304 comprises signature validator 306 and credential generator 308. Signature validator 306 comprises a signature validator for validating a digital signature (e.g., a signature received as part of a credential request). Credential generator 308 comprises a credential generator for generating a credential (e.g., a credential generator for generating a credential based at least in part on a private key, a credential generator for cryptographically generating a credential, etc.). Credential generator 308 interacts with credential data 314 and private key data of storage 310 via storage interface 312.

Credential system 300 comprises a system for determining whether a credential has been revoked. Credential system 300 receives a credential identifier or a set of credential identifiers from a database system and determines whether the associated credential or credentials has been revoked. Credential system 300 determines whether a credential has been revoked by looking up a credential identifier in a distributed ledger network. After determining validity for each received credential identifier, credential system 300 provides an indication of revoked credentials to a database system.

Credential system 300 additionally comprises a system for revoking a set of credentials. Credential system 300 receives an indication to revoke a set of credentials including a set of credential identifiers. For each credential identifier of the set of credential identifiers, credential system 300 stores an indication in a distributed ledger that the credential associated with the credential identifier is revoked.

Figure 4:
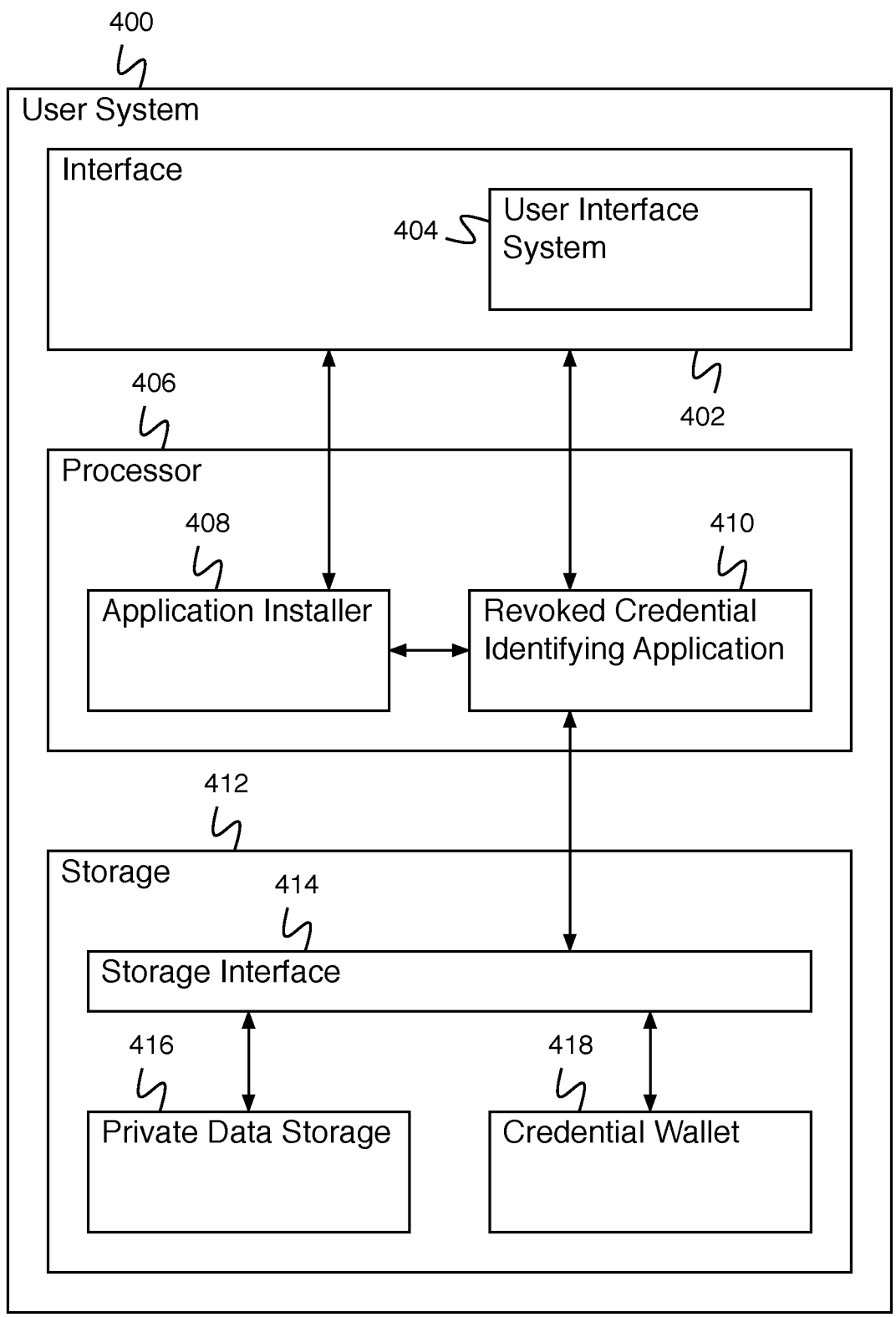
FIG. 4 is a block diagram illustrating an embodiment of a user system.

FIG. 4 is a block diagram illustrating an embodiment of a user system. In some embodiments, user system 400 of FIG. 4 comprises user system 106 of FIG. 1. In various embodiments, user system 400 comprises a personal computer, a mobile device, a tablet computer, etc. In the example shown, user system 400 comprises interface 402, processor 406, and storage 412. Interface 402 comprises an interface for communicating with processor 406 and with an external network (e.g., network 100 of FIG. 1, for communication with an administrator system, a database system, a credential system, etc.). Interface 402 additionally comprises user interface system for providing a user interface for interacting with a user. Processor 406 comprises a processor for processing data, performing computations, controlling communications, etc. Processor 406 comprises application installer 408 and revoked credential identifying application 410. Application installer 408 comprises an application installer for receiving an application from an external server and installing the application on user system 400. For example, revoked credential identifying application 410 is installed by application installer 408. Any other appropriate applications are additionally installed by application installer 408. Revoked credential identifying application 410 comprises an application for interacting with a database system to request a credential. Revoked credential identifying application 410 interacts with private data storage 416 and credential wallet 418 of storage 412 via storage interface 414.

Revoked credential identifying application 410 receives a request for a list of valid credentials (e.g., a part of a process for displaying valid credentials to a user). Revoked credential identifying application 410 then determines a list of stored credentials (e.g., stored in credential wallet 418), provides the list of stored credentials to a database system, receives an indication of revoked credentials from the database system, and determines the list of valid credentials based at least in part on the list of stored credentials and the revoked credentials.

Figure 5A:
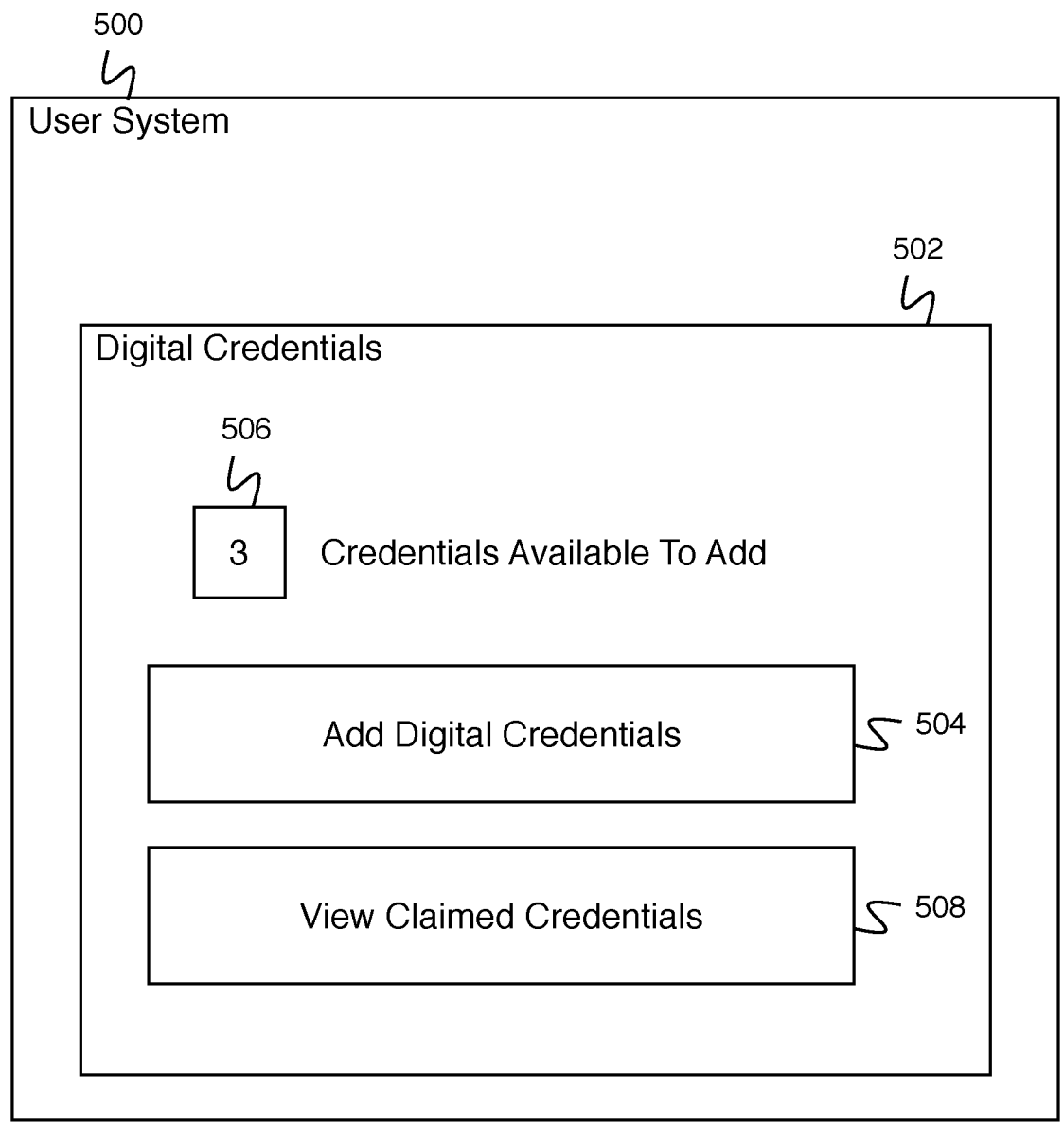
FIG. 5A is a diagram illustrating an embodiment of a user interface for a user system.

FIG. 5A is a diagram illustrating an embodiment of a user interface for a user system. In some embodiments, the user interface of FIG. 5A comprises a user interface provided by user interface system 404 of FIG. 4. In the example shown, user system 500 displays digital credentials window 502. Digital credentials window 502 displays add credentials button 504 and view claimed credentials button 508. Add credentials button 504 comprises number of available credentials button 506. Number of available credentials button 506 is updated with a current number of available credentials—for example, a current number of available credentials is updated on a schedule, each time a user accesses digital credentials window 502, etc. User system 500 updates number of available credentials button 506 by querying a server using user identifying information for the number of available credentials. In the event the user makes an indication to add credentials button 504, the user is provided a list of available credentials to add. In the event the user makes an indication to view claimed credentials button 508, the user is provided a list of claimed credentials for viewing. Determining a list of claimed credentials comprises determining whether any claimed credentials have been revoked.

Figure 5B:
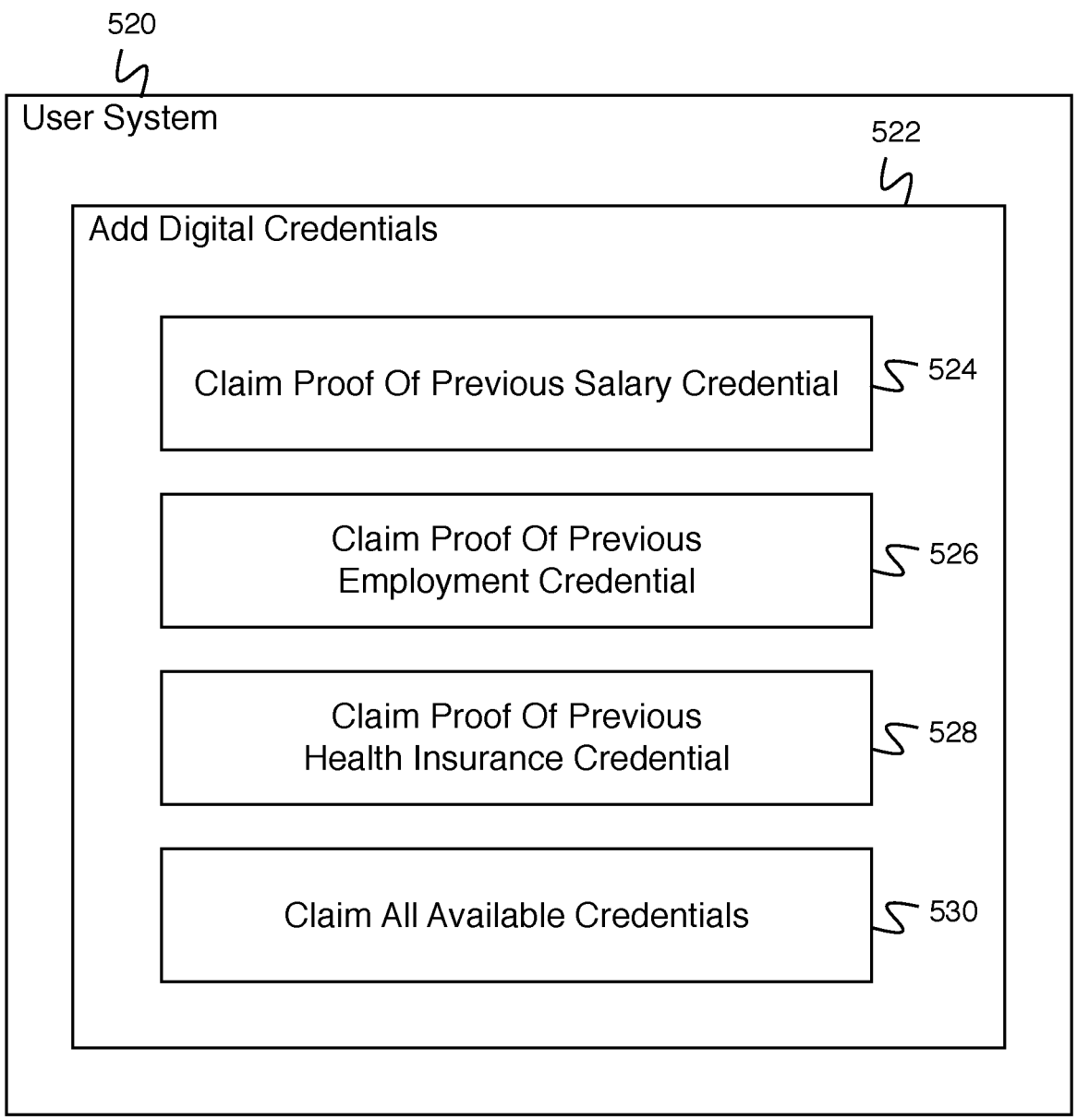
FIG. 5B is a diagram illustrating an embodiment of a user interface for a user system.

FIG. 5B is a diagram illustrating an embodiment of a user interface for a user system. In some embodiments, the user interface of FIG. 5B comprises a user interface provided by user interface system 404 of FIG. 4. In the example shown, user system 520 displays add digital credentials window 522. For example, add digital credentials window 522 is shown in response to an indication to an add digital credentials button (e.g., add digital credentials button 504 of FIG. 5A). In the example shown, add digital credentials window 522 displays claim proof of salary credential button 524, claim proof of employment credential button 526, claim proof of health insurance credential button 528, and claim all available credentials button 530. In the event the user makes an indication to a button, a process is started to claim the appropriate credential or credentials.

Figure 5C:
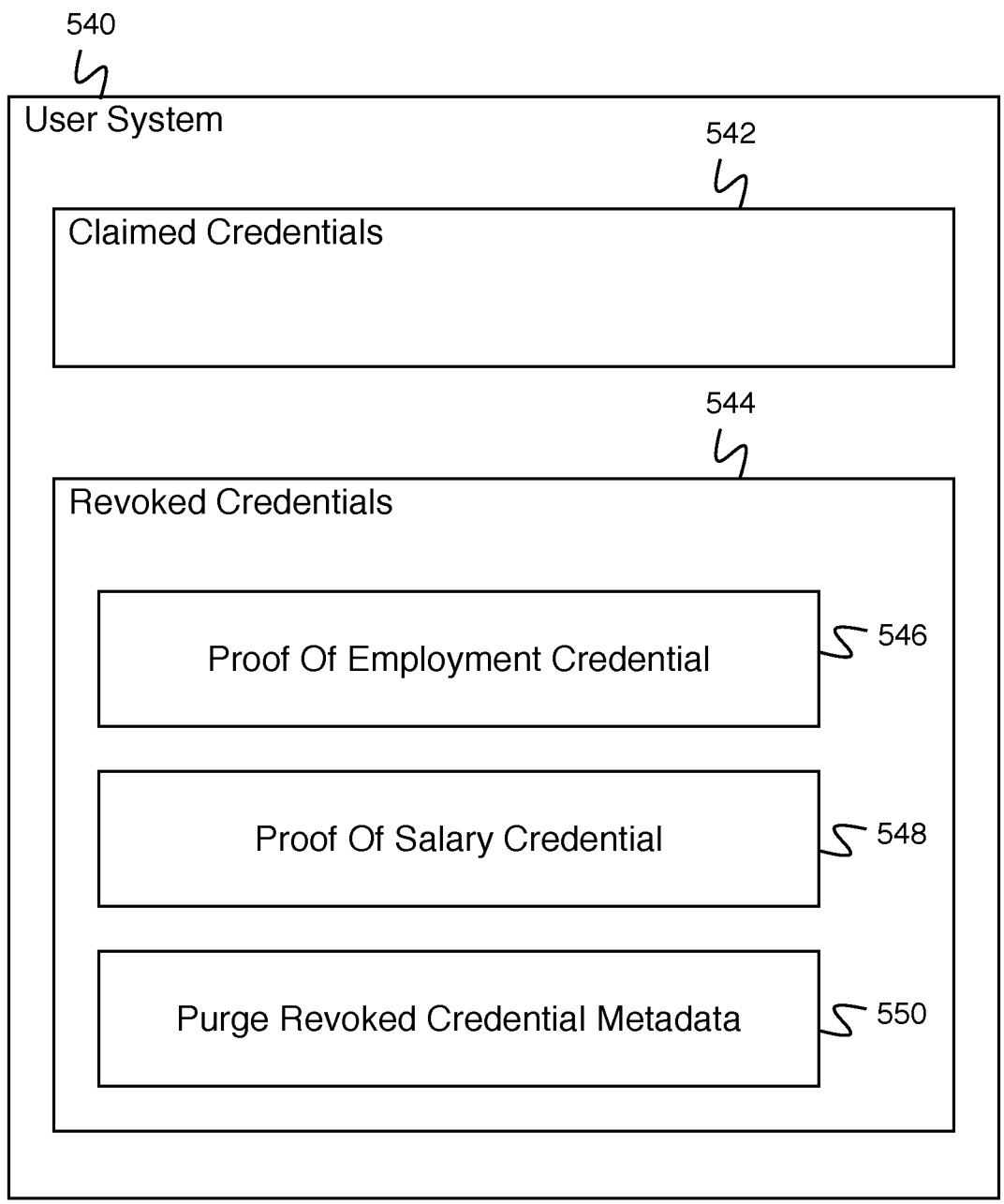
FIG. 5C is a diagram illustrating an embodiment of a user interface for a user system.

FIG. 5C is a diagram illustrating an embodiment of a user interface for a user system. In some embodiments, the user interface of FIG. 5C comprises a user interface provided by user interface system 404 of FIG. 4. In the example shown, user system 540 displays claimed credentials window 542 and revoked credentials window 544. For example, claimed credentials window 542 and revoked credentials window 544 are shown in response to an indication to a view claimed credentials button (e.g., view claimed credentials button 508 of FIG. 5A). Claimed credentials window 542 displays no claimed credentials. Revoked credentials window 544 displays proof of employment credential 546 and proof of salary credential 548. Showing proof of employment credential 546 and proof of salary credential 548 in revoked credentials window 544 comprises an indication that proof of employment credential 546 and proof of salary credential 548 have been revoked and can no longer be used. Credential data associated with proof of employment credential 546 and proof of salary credential 548 is deleted. Metadata associated with proof of employment credential 546 and proof of salary credential 548 is stored (e.g., to allow an indication of proof of employment credential 546 and proof of salary credential 548 to be shown in revoked credentials window 544). Revoked credentials window 544 additionally comprises purge revoked credential metadata button 550. When an indication to purge revoked credential metadata button 550 is received, metadata associated with proof of employment credential 546 and proof of salary credential 548 is deleted.

Figure 6:
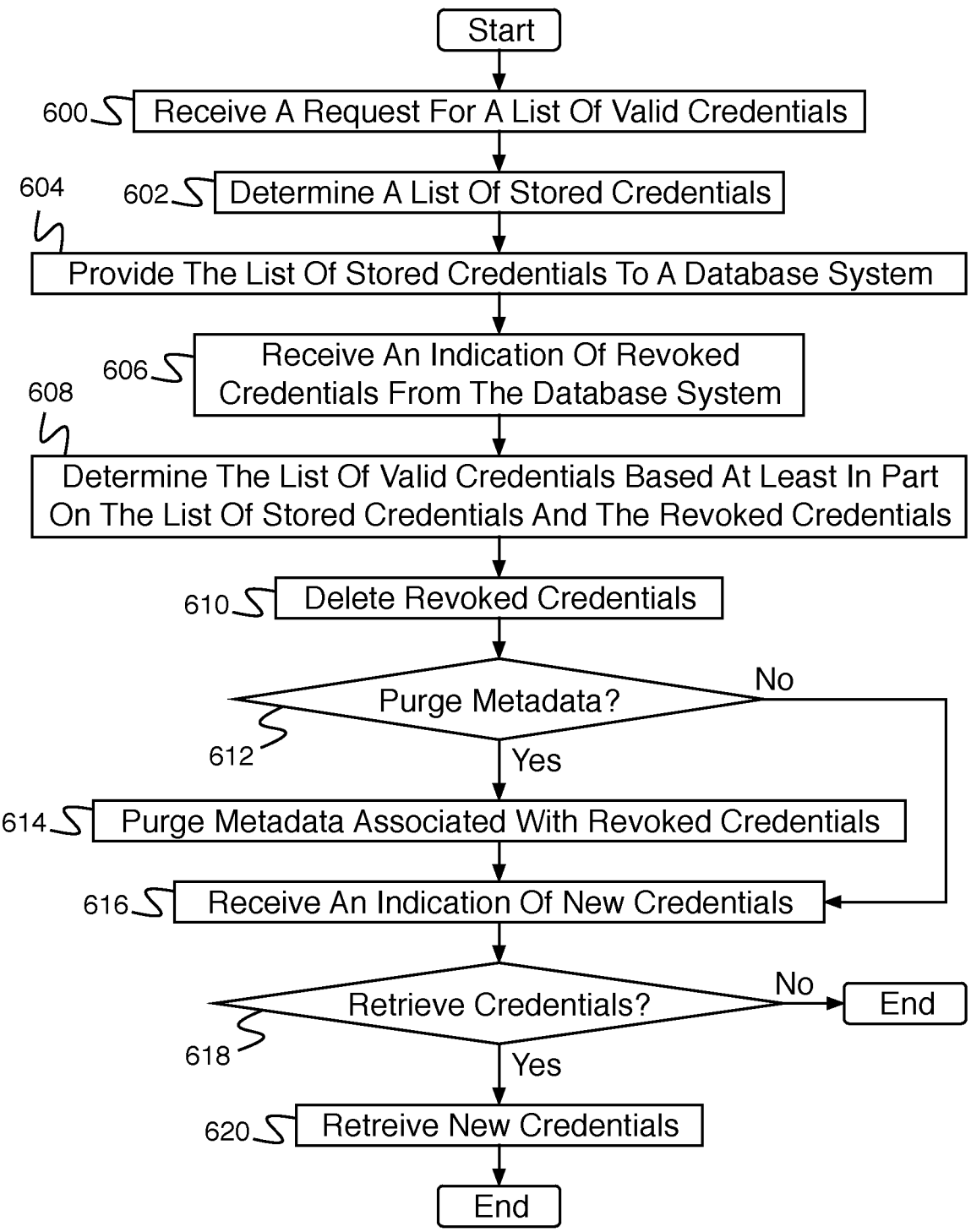
FIG. 6 is a flow diagram illustrating an embodiment of a process for identifying revoked credential information.

FIG. 6 is a flow diagram illustrating an embodiment of a process for identifying revoked credential information. In some embodiments, the process of FIG. 6 is executed by a user system (e.g., user system 106 of FIG. 1). In the example shown, in 600, a request for a list of valid credentials is received. In 602 a list of stored credentials is received. In 604, the list of stored credentials is provided to a database system. In 606, an indication of revoked credentials is received from the database system. In 608, the list of valid credentials is determined based at least in part on the list of stored credentials and the revoked credentials. For example, the credentials available are available based upon a user identity (e.g., who the user is), what the credentialing service knows it has already given the user, credentials previously known to be revoked, or any other appropriate credential. In 610, revoked credentials are deleted. In 612, it is determined whether to purge metadata. In some embodiments, it is determined to purge metadata in the event that an indication to a purge revoked credential metadata button is received. In the event it is determined not to purge metadata, control passes to 616. In the event it is determined to purge metadata, control passes to 614. In 614, metadata associated with revoked credentials is purged. In 616 an indication of new credentials is received. For example, new credentials comprise new credentials generated as a byproduct of revoking credentials. In 618, it is determined whether to retrieve credentials (e.g., the new credentials). In some embodiments, it is determined to retrieve credentials in the event that an indication to a claim credential button is received. In the event it is determined not to retrieve credentials, the process ends. In the event it is determined to retrieve credentials, control passes to 620. In 620, new credentials are retrieved.

Figure 7:
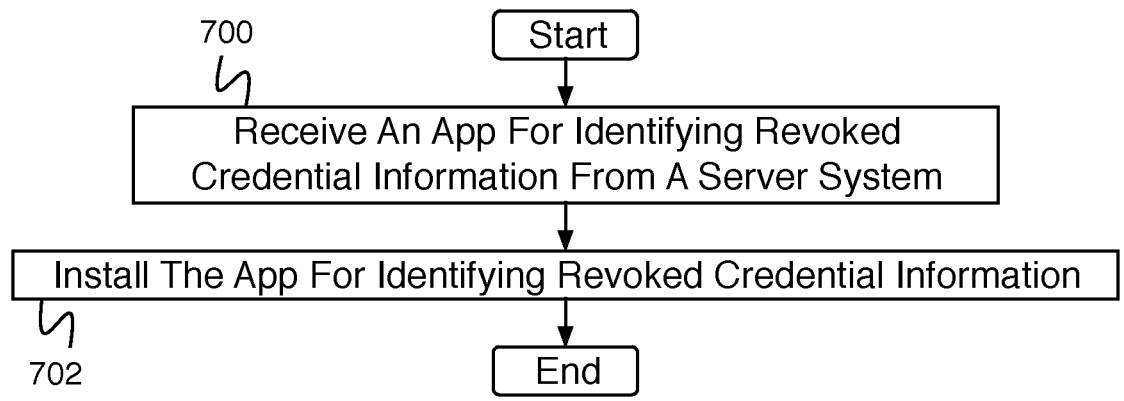
FIG. 7 is a flow diagram illustrating an embodiment of a process for installing an app.

FIG. 7 is a flow diagram illustrating an embodiment of a process for installing an app. In some embodiments, the process of FIG. 7 is executed by application installer 408. In the example shown, in 700, an app for identifying revoked credential information is received from a server system. In 702, the app for identifying revoked credential information is installed.

Figure 8:
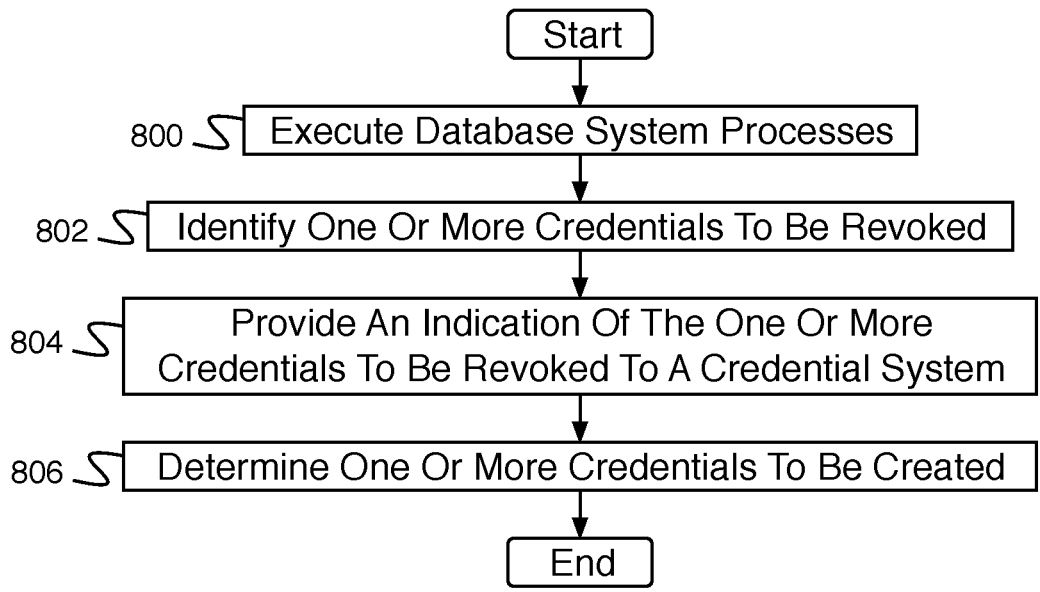
FIG. 8 is a flow diagram illustrating an embodiment of a process for a credential revoking database system process.

FIG. 8 is a flow diagram illustrating an embodiment of a process for a credential revoking database system process. In some embodiments, the process of FIG. 8 is executed by a database system (e.g., database system 104 of FIG. 1). For example, the process of FIG. 8 comprises a process of user data processes 206 of FIG. 2. In the example shown, in 800, database system processes are executed. For example, processes are executed for creating data, deleting data, modifying data, adding an employee to an employee database, removing an employee from an employee database, etc. In 802, one or more credentials are identified to be revoked. For example, in the event the process comprises an employee termination process, a credential verifying employment status is revoked. In 804, an indication of the one or more credentials to be revoked is provided to a credential system. In 806 one or more credentials to be created are determined. For example, in the event the process comprises an employee termination process, a credential verifying a previous employment status is created.

Figure 9:
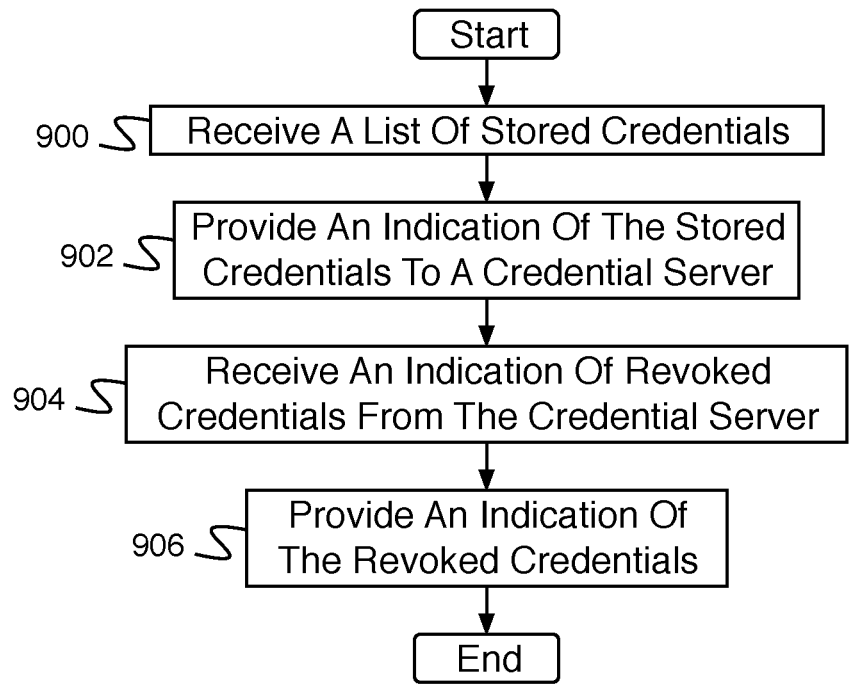
FIG. 9 is a flow diagram illustrating an embodiment of a process for a determining revoked credentials.

FIG. 9 is a flow diagram illustrating an embodiment of a process for a determining revoked credentials. In some embodiments, the process of FIG. 9 is executed by a database system (e.g., database system 104 of FIG. 1). For example, the process of FIG. 8 comprises a process of user data processes 206 of FIG. 2. In the example shown, in 900, a list of stored credentials is received (e.g., from a user system). In 902, an indication of the stored credentials is provided to a credential server. In 904, an indication of revoked credentials is received from the credential server. In 906, an indication of the revoked credentials is provided.

Figure 10:
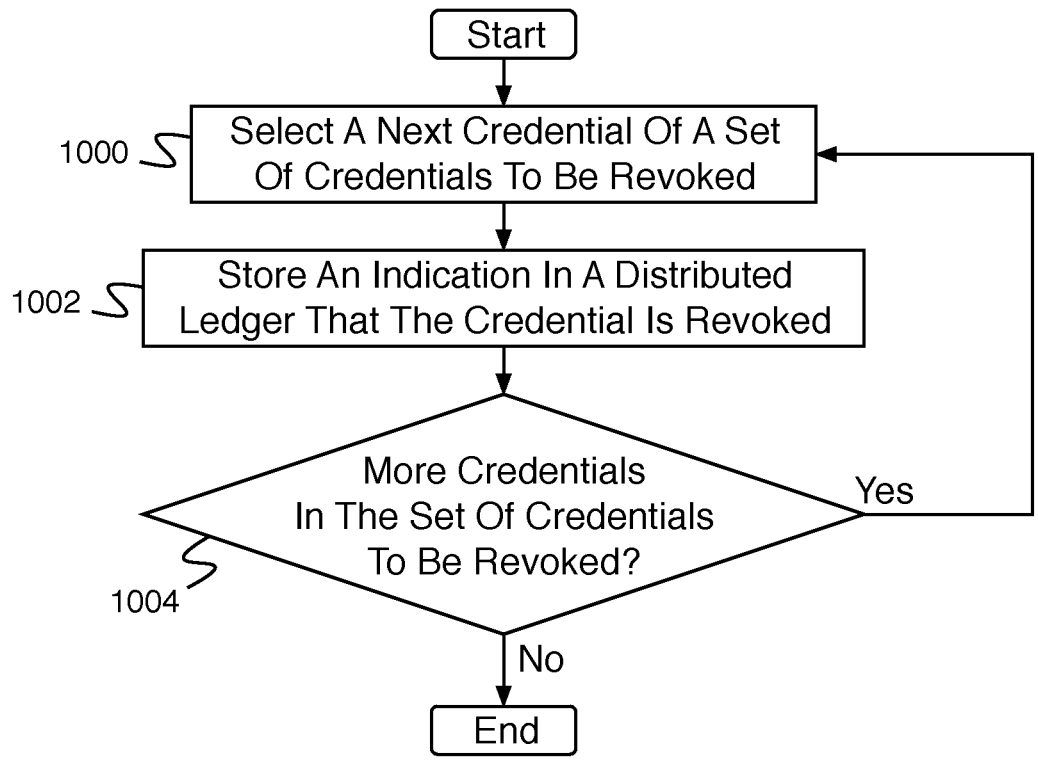
FIG. 10 is a flow diagram illustrating an embodiment of a process for revoking credentials.

FIG. 10 is a flow diagram illustrating an embodiment of a process for revoking credentials. In some embodiments, the process of FIG. 10 is executed by a credential system (e.g., credential system 108 of FIG. 1). For example, the process of FIG. 10 is executed by a credential system in response to an indication of one or more credentials to be revoked. In 1000, a next credential of a set of credentials to be revoked is selected. In 1002, an indication is stored in a distributed ledge that the credential is revoked. In 1004, it is determined whether there are more credentials in the set of credentials to be revoked. In the event it is determined that there are more credentials in the set of credentials to be revoked, control passes to 1000. In the event it is determined that there are not more credentials in the set of credentials to be revoked, the process ends.

Figure 11:
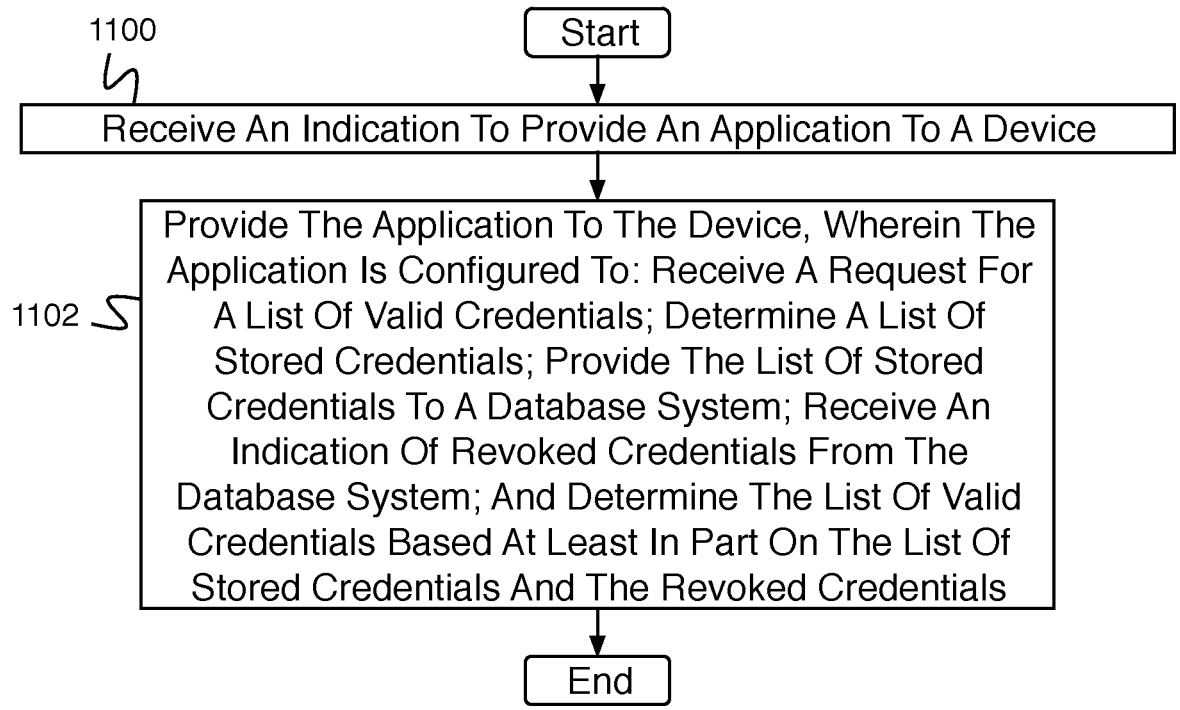
FIG. 11 is a flow diagram illustrating an embodiment of a process for providing an application.

FIG. 11 is a flow diagram illustrating an embodiment of a process for providing an application. In some embodiments, the process of FIG. 11 is executed by database system 104 of FIG. 1. In the example shown, in 1100, an indication to provide an application to a device is received. In 1102, the application is provided to the device, wherein the application is configured to receive a request for a list of valid credentials, determine a list of stored credentials, provide the list of stored credentials to a database system, receive an indication of revoked credentials from the database system, and determine the list of valid credentials based at least in part on the list of stored credentials and the revoked credentials.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A system for providing an application, comprising:
an interface configured to:
receive an indication to provide the application to a device;
a hardware processor; and
a memory coupled with the hardware processor, wherein the memory is configured to provide the hardware processor with instructions which when executed cause the hardware processor to:
provide the application to the device, wherein the application is configured to:
receive a request for a list of valid credentials;
determine a list of stored credentials;
provide the list of the stored credentials to a database system, wherein the database system is configured to:
determine revoked credentials, comprising to:
query a credential system to determine whether a revocation indication has been written to a distributed ledger network for at least one stored credential of the list of the stored credentials; and
determine new credentials;
receive an indication of the revoked credentials from the database system;
receive an indication of the new credentials from the database system;
determine the list of the valid credentials based at least in part on the list of the stored credentials, the revoked credentials, and the new credentials;
display the list of the valid credentials and the revoked credentials;
determine whether to purge metadata associated with the revoked credentials; and
in response to a determination that the metadata associated with the revoked credentials is to be purged, delete, from a user system, one or more of the stored credentials associated with the revoked credentials and the metadata associated with the revoked credentials.

2. The system of claim 1, wherein the hardware processor is further configured to retrieve the new credentials.

3. The system of claim 1, wherein the database system is further configured to revoke one or more credentials.

4. The system of claim 3, wherein one or more new credentials are provided to the database system for identifying revoked credential information.

5. The system of claim 3, wherein the database system is further configured to provide a set of revoked credential identifiers to the credential system.

6. The system of claim 5, wherein the credential system is configured to:
for each credential identifier of the set of revoked credential identifiers:
store an indication in a distributed ledger that the credential associated with the credential identifier is revoked.

7. The system of claim 1, wherein the database system is configured to:
receive the list of the stored credentials;
provide an indication of the stored credentials to a credential server;
receive an indication from the credential server that one or more stored credentials of the stored credentials has been revoked.

8. The system of claim 1, wherein the stored credentials comprise credentials verifying proof of salary, proof of employment, or proof of health insurance status.

9. A method for providing an application, comprising:
receiving an indication to provide the application to a device; and
providing, using a processor, the application to the device, wherein the application is configured to:
receive a request for a list of valid credentials;
determine a list of stored credentials;
provide the list of the stored credentials to a database system, wherein the database system is configured to:
determine revoked credentials, comprising to:
query a credential system to determine whether a revocation indication has been written to a distributed ledger network for at least one stored credential of the list of the stored credentials; and
determine new credentials;
receive an indication of the revoked credentials from the database system;
receive an indication of the new credentials from the database system;
determine the list of the valid credentials based at least in part on the list of the stored credentials, the revoked credentials, and the new credentials;
display the list of the valid credentials and the revoked credentials;
determine whether to purge metadata associated with the revoked credentials; and
in response to a determination that the metadata associated with the revoked credentials is to be purged, delete, from a user system, one or more of the stored credentials associated with the revoked credentials and the metadata associated with the revoked credentials.

10. A computer program product for providing an application, the computer program product being embodied in a non-transitory computer readable storage medium and comprising computer instructions which when executed cause a processor to perform operations comprising:
receiving an indication to provide the application to a device; and providing the application to the device, wherein the application is configured to:
  receive a request for a list of valid credentials;
  determine a list of stored credentials;
  provide the list of the stored credentials to a database system, wherein the database system is configured to:
    determine revoked credentials, comprising to:
      query a credential system to determine whether a revocation indication has been written to a distributed ledger network for at least one stored credential of the list of the stored credentials; and
    determine new credentials;
  receive an indication of the revoked credentials from the database system;
  receive an indication of the new credentials from the database system;
  determine the list of the valid credentials based at least in part on the list of the stored credentials, the revoked credentials, and the new credentials;
  display the list of the valid credentials and the revoked credentials;
  determine whether to purge metadata associated with the revoked credentials; and
  in response to a determination that the metadata associated with the revoked credentials is to be purged, delete, from a user system, one or more of the stored credentials associated with the revoked credentials and the metadata associated with the revoked credentials.

11. A system for identifying revoked credential information, comprising:
an interface configured to:
  receive a request for a list of valid credentials; and
a hardware processor; and
a memory coupled with the hardware processor, wherein the memory is configured to provide the hardware processor with instructions which when executed cause the hardware processor to:
  determine a list of stored credentials;
  provide the list of the stored credentials to a database system, wherein the database system is configured to:
    determine revoked credentials, comprising to:
      query a credential system to determine whether a revocation indication has been written to a distributed ledger network for at least one stored credential of the list of the stored credentials; and
    determine new credentials;
  receive an indication of the revoked credentials from the database system;
  receive an indication of the new credentials from the database system;
  determine the list of the valid credentials based at least in part on the list of the stored credentials, the revoked credentials, and the new credentials;
  display the list of the valid credentials and the revoked credentials;
  determine whether to purge metadata associated with the revoked credentials; and
  in response to a determination that the metadata associated with the revoked credentials is to be purged, delete, from a user system, one or more of the stored credentials associated with the revoked credentials and the metadata associated with the revoked credentials.

* * * * *